July 2, 1957 V. H. HENTHORN 2,797,660
BELT SCRAPER FOR LABEL PASTING MACHINE
Filed Oct. 27, 1954 4 Sheets-Sheet 1
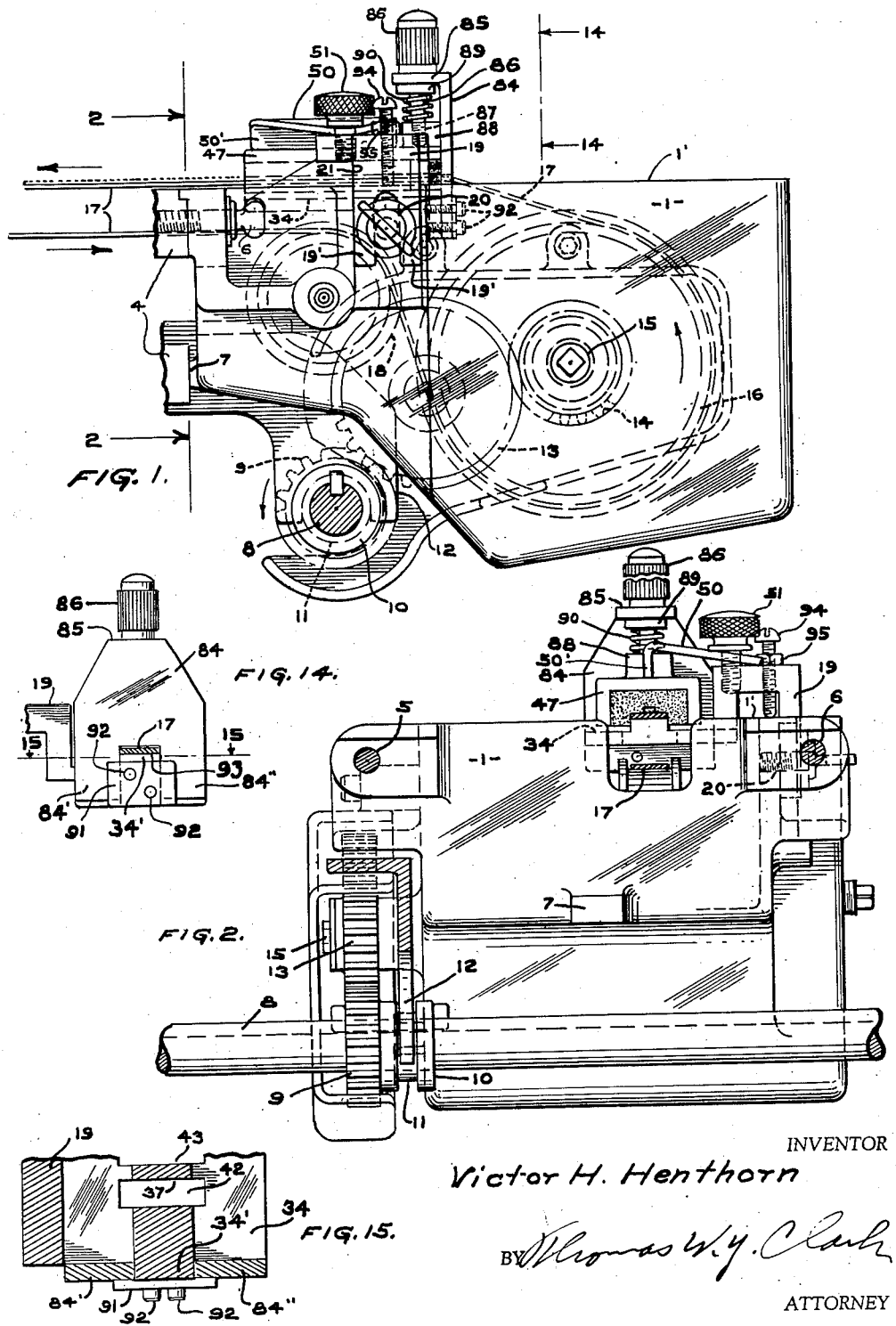
INVENTOR
Victor H. Henthorn
BY Thomas W. Y. Clark
ATTORNEY

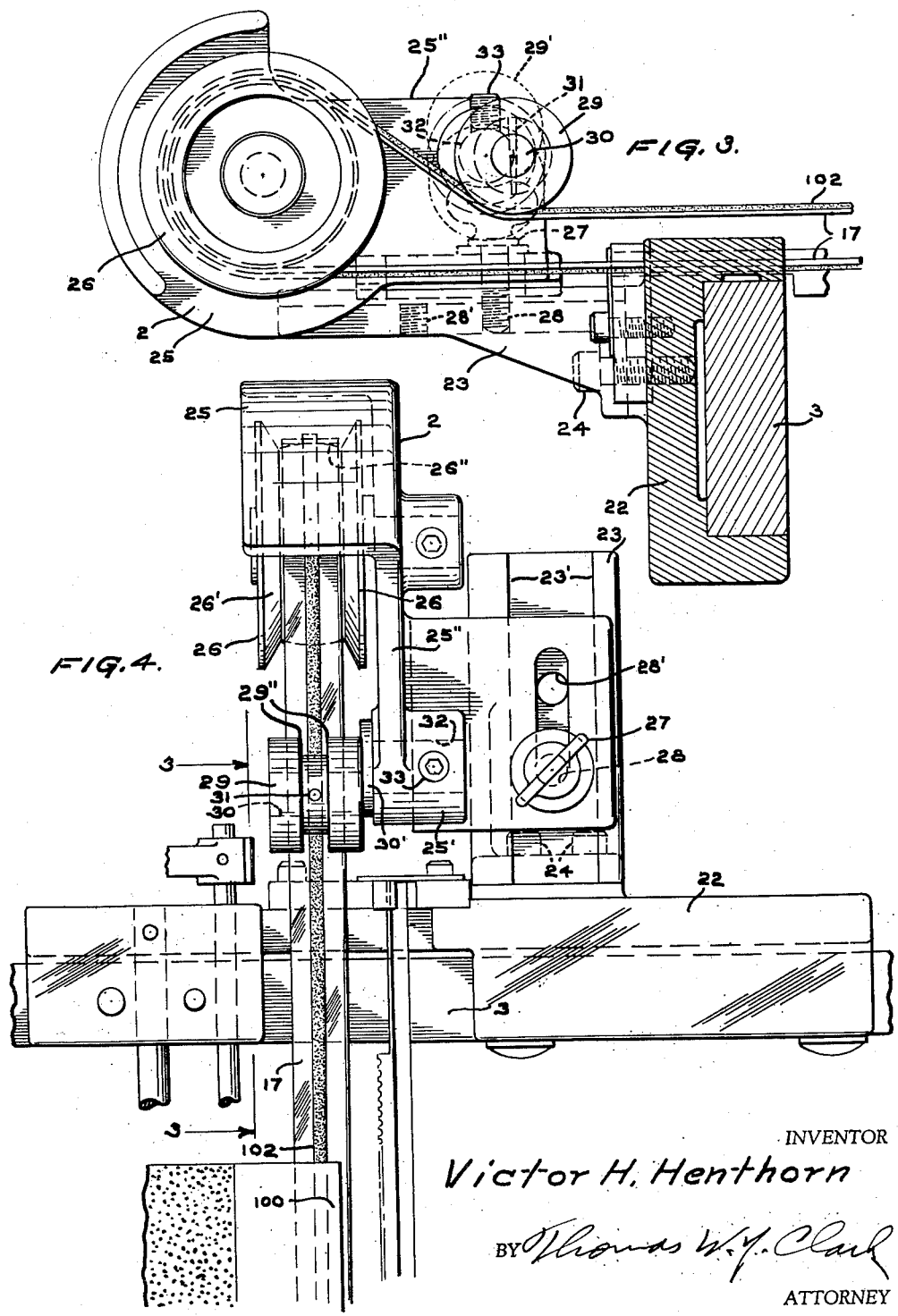

July 2, 1957 V. H. HENTHORN 2,797,660
BELT SCRAPER FOR LABEL PASTING MACHINE
Filed Oct. 27, 1954 4 Sheets-Sheet 3
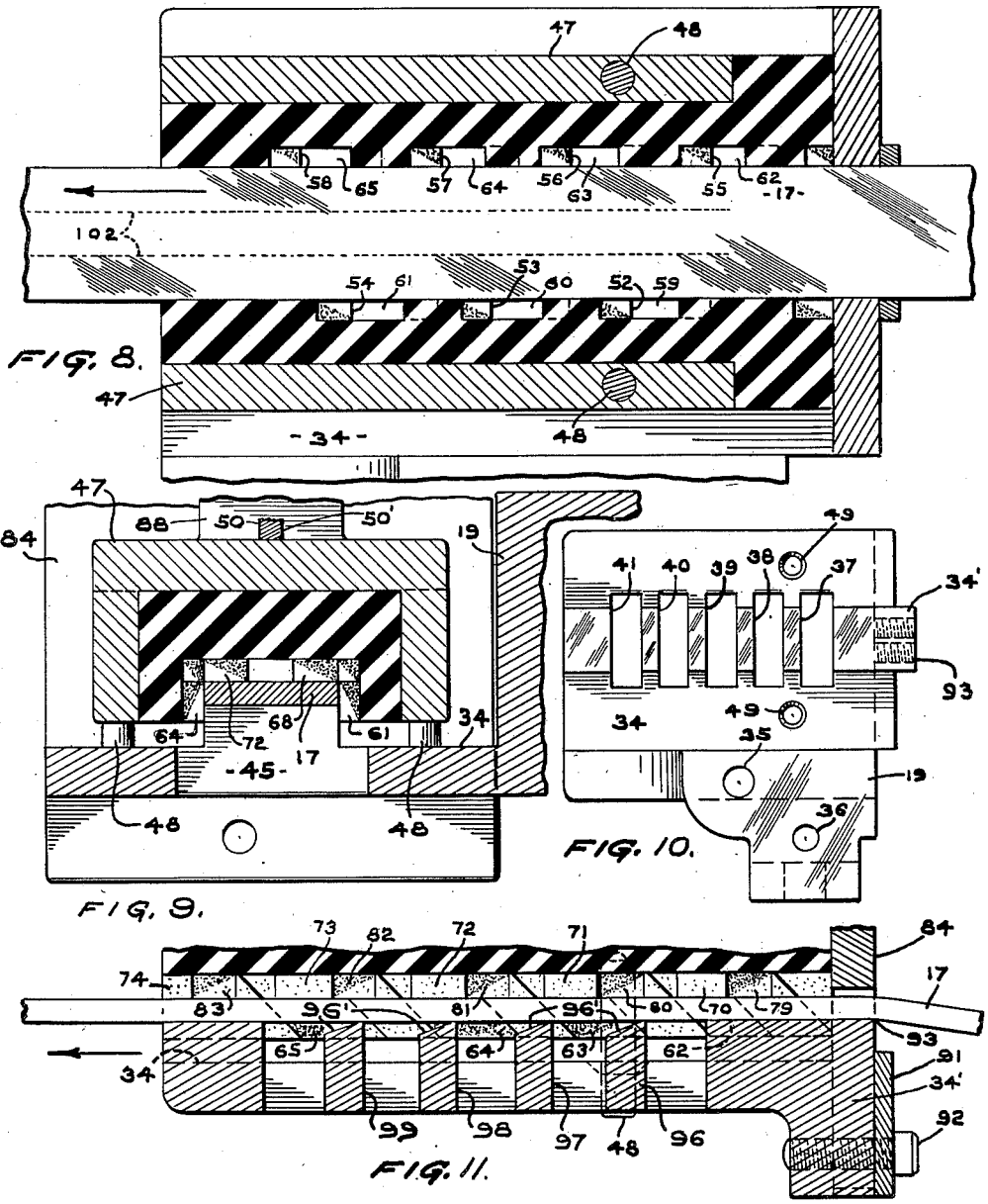
INVENTOR
Victor H. Henthorn.
BY
ATTORNEY

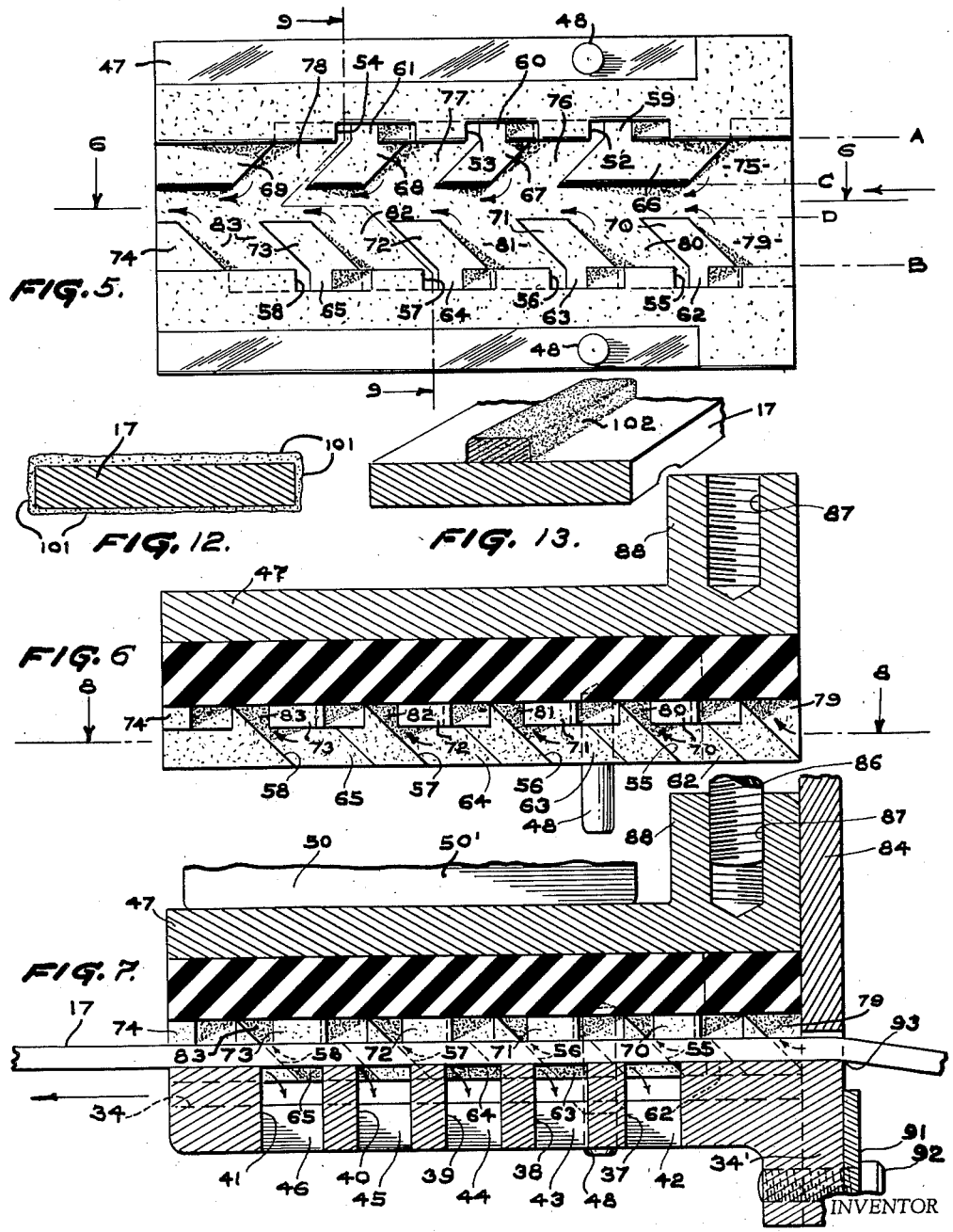

United States Patent Office 2,797,660
Patented July 2, 1957

2,797,660

BELT SCRAPER FOR LABEL PASTING MACHINE

Victor H. Henthorn, Baltimore, Md., assignor to The Burt Machine Company, Incorporated, Baltimore, Md., a corporation of Maryland Application October 27, 1954, Serial No. 464,936

12 Claims. (Cl. 118—257)

The present invention relates to container labeling machines and in particular to an improved paste regulating mechanism or device for applying paste to the trailing end of a label to cause it to adhere to the side of a can, or other round container, as it rolls through the machine. An example of such a machine is shown in the patent to Charles H. Wild, No. 1,627,946, dated May 10, 1927.

The general operation of these container labeling machines is that as the containers are rolled through the machine along a horizontal path, glue is spotted along the side surfaces of the container which picks up a single label as the container rolls over the label pack. The pack is held by suitable mechanism beneath the machine in a special spring supported carrier. As the container continues to roll, the label is wrapped about the outside surface of the container, and as the opposite end of the label is removed from the pack, a supply of paste is applied by a paste-delivering endless belt. The paste is applied adjacent the trailing end of the label which is adapted to be completely withdrawn from the pack and applied to the surface of the container, or, if the label covers the whole cylindrical surface of the container, then over the front end of the label where the paste causes the two paper surfaces to become united by the action of the paste.

It is with the paste applying device carried by the labeling machine that the present invention is principally concerned.

One of the problems in labeling machines, has always been a suitable mechanism for applying paste to the trailing end of the label, and there is a continuous effort to improve this device both in its structure and economical operation. If too much paste is picked up by the belt and carried beyond the paste pot, it is dropped or brushed off on parts of the machine. It also gums the machine which interferes with its operation, or if not enough paste is picked up or the paste is not properly distributed over the end of the label, the end of the label will not stick to the container or to the opposite end of the label which has been wrapped around the container.

Therefore, the primary object of the present invention is to construct an improved paste delivering device which will deliver to the trailing end of a label the proper quantity of paste.

Another object of the invention is to provide means whereby the amount of paste carried on the paste-delivering elements may be accurately regulated.

A further object of the invention is to provide means for removing the excess paste initially picked up by the paste-delivering belt and evenly redistributing a part of the removed paste to a defined area on the paste belt.

A still further object of the invention is to provide a belt scraping assembly that is so constructed and mounted as to be easily and quickly taken apart and cleaned and reassembled.

Still another object of the invention is to provide a belt scraping assembly that will redeposit into the paste pot excess paste scraped from the bottom of the paste belt.

Still another object of the invention is to provide improved means for adjusting the height of the upper run of the paste belt relative to the horizontal path of the rolling containers.

While certain general objects of the invention have been enumerated, its use and advantages will become more apparent as the nature of the invention is more fully disclosed which consists in its novel construction together with the combination and arrangement of its parts as illustrated and described in its preferred form in which:

Figure 1 is a side view in elevation of a paste holding pot and the paste belt and belt scraping assembly.

Figure 2 is a front elevation of the same taken on line 2—2 of Figure 1.

Figure 3 is a side elevation of one of the belt supporting pulleys adapted to be located at the belt end opposite the paste pot for supporting the other end of the endless paste delivery belt, taken on the line 3—3 of Figure 4.

Figure 4 is a top plan view of the assembly shown in Figure 3.

Figure 5 is an enlarged inverted plan view of the side and top belt scraping element.

Figure 6 is a longitudinal sectional view taken on the line 6—6 of Figure 5, with the element upright.

Figure 7 is a longitudinal sectional view similar to Figure 6 showing an assembly of the side and top scraping elements, and one form of the scraping element for the bottom of the belt.

Figure 8 is a sectional view taken on the line 8—8 of Figure 6 showing a fragmentary view of the paste carrying belt.

Figure 9 is a transverse sectional view, top side up, taken on the line 9—9 of Figure 5.

Figure 10 is a top plan view of the supporting bracket for the paste assembly mechanism together with a plan view of the bottom scraping element referred to in Figure 7.

Figure 11 is a fragmentary longitudinal sectional view similar to that shown in Figure 7 of a modified form of a bottom scraping element.

Figure 12 is an enlarged fragmentary sectional perspective view of the paste delivery belt showing the initial coating of paste before the belt reaches the scraping assembly.

Figure 13 is a view similar to Figure 12 showing the location and amount of paste left on the paste delivery belt after it has passed through the scraping assembly.

Figure 14 is a view in elevation of the outer side of the initial paste depth gauge plate for the paste conveyor belt taken on the line 14—14 of Figure 1.

Figure 15 is a fragmentary sectional view taken on the line 15—15 of Figure 14.

In the description like numerals are used to indicate similar parts throughout the several views.

The paste pot assembly is referred to generally by the numeral 1, and the paste belt outer supporting assembly is designated generally by the numeral 2. The paste pot assembly 1 is located on one side of the machine frame 3, and the outer supporting assembly 2 is supported on the opposite side thereof.

The paste pot assembly 1 is secured to a bracket 4 by the screws 5 and 6 and an abutting member 7. The bracket 4 is carried on one of the two longitudinal rails of the frame of the machine, the opposite rail being shown at 3, and the bracket is adjustable longitudinally of the machine frame. Also carried on the machine frame is a driving shaft 8 having a slidable driving gear 9 keyed to rotate with the shaft. The gear has an offset hub portion 10 and a groove 11 into which a yoke 12 on the paste pot engages for moving the gear along the shaft as the bracket 4 is shifted to different locations when and if the paste pot assembly is moved. There is an intermediate driving gear 13 on the pot side for engaging the driving gear 9 and a gear 14 also mounted on the side of the paste pot and which is fixed to a shaft 15 passing through the pot. Fixed to the shaft 15 within the paste pot is a pulley 16 for supporting one end and driving paste delivery belt 17. The drive gear 9 and the paste belt 17 travel in the directions as indicated by the arrows in Figure 1. Also located within the paste pot is an idler wheel 18 for positioning the lower return run of the belt. This wheel 18 is rotated by the friction of the paste belt.

The paste belt scraping assembly is carried on the paste pot assembly housing 1' and is adjustable up and down relative thereto. This scraping assembly is positioned so that the upper run of the paste belt 17 will pass between the scraping elements carried thereby. The assembly is fastened to the paste pot housing 1' by an overhanging bracket 19 which is slotted and held in place by a thumb screw 20 passing between and bearing against the extended parts 19' of bracket 19. The bracket is held in alignment by the offset portions of the pot housing as shown at 21. This scraping assembly may be removed from the paste pot assembly by loosening the thumb screw 20 and moving the assembly upwardly. This arrangement also allows for the vertical adjustment of the scraping assembly relative to the paste pot. The belt is of such length as to extend across the horizontal run or path of the rolling containers and to the opposite side of the machine.

On the opposite side of the frame for supporting the opposite end of the belt is a second pulley 26 including a supporting frame for the assembly 2 which comprises a bracket 22 slidably mounted on the machine frame 3. To this bracket there is attached a second bracket 23 fixed to the first bracket 22 by studs 24.

Adjustably supported on the bracket 23 is a pulley supporting housing 25 for supporting pulley 26. The pulley 26 is provided with tapered sides 26' and a crowned face 26''. The pulley support 25 is slidably mounted along horizontal channel 23' of the bracket 23 and is held in position by the thumb screw 27. In order to increase the adjustment range of the belt pulley support 25 there are provided two threaded holes 28 and 28' in which the thumb screw is receivable. The belt pulley support 25 also carries a non-rotating guide 29 shown in the form of a grooved pulley which is fixed to a shaft 30 by pins 31 to prevent it from rotating. On the shaft 30 there is formed a disk 30' and extending from the opposite side of the disk and eccentrically to the first mentioned shaft 30 is a second shaft 32 which is secured within a suitable bearing 25' on the web 25'' of the support 25 by set screw 33. By this arrangement the guide 29 may be adjusted in an upward or downward direction by loosening the set screw 33 and rotating the shaft 32 as indicated by the dotted lines 29' in Figures 3. The belt guide is preferably made of circular form so that when it is adjusted, regardless of its position, its outer surface will always be equidistant from the center of the eccentric shaft 32. The guide member is provided with a recess, or groove, 29'' in order that only the outer edges of the upper surface of the top run of the belt will be contacted, otherwise the paste would not remain in its defined area as it is carried beneath the guide.

The scraping assembly bracket 19 is of inverted U-form extending upwardly on the outside of the paste pot housing and downwardly on the inside of the housing and then laterally to form a horizontal supporting portion 34, see Figure 9. On the upper surface of this portion 34 are the bottom scrapers for the paste belt. These scraping elements are preferably constructed as a part of the portion 34, but may be formed separately and attached to the portion 34 if desired. The bracket 19 is provided with threaded holes 35 and 36 at the top of its inverted U, whose purpose will be referred to later. The bottom scrapers consist of a plurality of spaced individual scraping elements traversing the underside of the belt path with openings between as shown by numerals 37 to 41, inclusively, shown best in Figure 10. The openings between the scraping elements are shown by numerals 42 to 46, Figure 7. These bottom scrapers and openings are preferably located over the paste pot in order that the paste scraped from the belt will be deposited again into the pot.

Supported upon and over these bottom paste scraping elements are paste scraping members for the sides and top of the paste belt. These side and top scrapers are constructed of a yieldable material, such as neoprene, and are preferably molded in a single unit. The support for this scraping unit is a channeled housing 47, preferably of metal. This scraping unit and the housing 47 are held in horizontal alignment with the horizontal portion 34 of the bracket 19 by pins 48 carried by the housing 47 which are slidably receivable into the holes 49 carried in the portion 34.

While the side and top scraping unit is held in horizontal alignment by the pins 48, it must also be held down on the upper surface and sides of the paste belt. For this there is provided an L-shaped clamp 50. This clamp is provided with a hole adjacent one edge thereof to accommodate a thumb screw 51. The opposite end of the clamp is formed into a relatively short L-portion 50'. This short L-portion is adapted to contact the upper surface of the housing 47 adjacent its center line. The thumb screw 51 is threadably receivable into the threaded hole 35 of the bracket 19. By this arrangement it is seen that by tightening the screw 51 pressure may be applied to the housing 47 which in turn increases the pressure on the upper scraping unit and increases the friction between the upper scraping unit and the paste belt.

As previously stated, the yieldable members carried within the housing 47 are adapted to scrape the edges and a portion only of the top surface of the paste belt. Referring in particular to Figures 5 to 9 inclusive, the upper scraping unit is provided with a recess, or channel, the width of which is indicated by the letters A—B, as shown in Figure 5. About the sides and top of the channel are scraping elements for scraping and cleaning as far as possible all the paste from the lateral edges and that portion of the top surface adjacent its sides. The top scrapers do not extend all the way across the top of the belt, but extend outwardly from the side of the channel, a distance of approximately three-eighths the width of the belt from each side, leaving an unscraped space on the upper surface of the run of the belt of approximately one-fourth the distance of the width as indicated by the letters C—D in Figure 5. This unscraped central area of the top surface of the top run of the belt is the only area upon which any paste is left after the belt has passed through the scraping assembly.

As stated, the side and top scraping elements are preferably molded in a single unit from a yieldable material. The scraping edges of the elements coming in contact with the top of the belt are abrupt, tapered away from the belt or trailing edge in order to give a scraping action upon the belt surface. The side scraping elements extend in vertical planes adjacent and above and below the lateral edges of the belt channel and at such distance as to contact the lateral edges of the belt. These side scrapers are also sloped from bottom to top in the direction of the run of the belt at approximately 45 degrees. These side scraping elements are indicated by numerals 52 to 58, Figure 5. Between each pair of the elements there is a space, or opening 59 to 65. These openings run for the full height of the scraping element and likewise extend above and below the normal running edges of the paste belt. The top scraping elements 66 to 74 extend outwardly from each side of the belt channel and along the top thereof for a distance of approximately three-eighths the width of the belt, leaving approximately one-quarter of the upper surface of the belt adjacent its center free to carry the paste as above stated. These top scraping elements also extend outwardly from the sides of the channel at an angle of approximately forty-five degrees being sloped in the direction of the travel of the belt. The top scraping elements are also spaced apart leaving openings therebetween and designated by the numerals 75 to 83. The openings lying between the side scraping elements are of such height as to have their upper ends connect at right angles with the outer ends of the corresponding openings lying between the upper or belt top scraping elements. These connected openings form a plurality of channels along the sides and top of the belt channel which receive paste scraped from the belt by the scraping elements. This paste collected in the openings between the side and top scraping elements is forced first upwardly, then along the openings by the action of the belt due to the angle of the connecting side and top openings and out onto the central area of the belt. With this arrangement it will be seen that the paste scraped from the sides and top of the belt will be collected in the openings betwen the scraping elements and will act to keep an even deposit of paste in the center of the belt, of course if the openings fill up, any surplus will be redeposited to the paste pot.

Carried on the scraping assembly and on the end through which the paste belt passes into the assembly is a plate 84 which is well shown in Figures 14 and 15. The lower center of this plate 84 is cut away from its lower edge upwardly toward its center to leave a rectangular opening adjacent its lower end. The plate extends downwardly on each side of the opening to form side portions 84' and 84". The upper end 85 of the plate 84 is bent at right angles and has a hole adjacent its center to slidably receive a thumb screw 86. This thumb screw is threadably receivable into the hole 87 in the upstanding projection 88 on the housing 47, see Figures 6 and 7. Under the right angle portion 85 of the plate and encircling the screw is a fixed washer 89, and between the projection 88 on the housing 47 and the washer is a compression spring 90. The lower end of the plate 84 is slidably held in contact with the end of portion 34 of the bracket 19 by a plate 91 held by screws 92. In order to provide clearance between the portion 34 of the bracket 19 and the plate 91 for the sliding of the leg members 84' and 84" the member 34 is extended to form a projection 34' which is substantially the width of the opening in the lower portion of the plate 84 and a trifle thicker. The width of the opening in the plate 84 is substantially the same as that of the paste belt which runs through it. As the portion 34' extends out even with the outer surface of the plate 84, the outer edge 93 of the portion 34', see Figure 11, acts initially to scrape off surplus paste from the bottom of the paste belt as it enters the scraping assembly. As the bottom scraping edge 93 is fixed, the height of the opening may be either increased or decreased to control the paste intake on the belt by operating the thumb screw 86 which in turn moves the plate 84 either up or down relative to the extended portion 34'.

In order to closely maintain the position or regulate the movement of the scraping assembly, when removing and replacing the assembly, there is provided a threaded screw 94 having a lock nut 95 which is threaded into the hole 36 in the bracket 19 and having its lower end in contact with the paste pot housing 1'. By setting this screw at a predetermined point, or by moving it up or down, the scraping assembly's position may be kept under control when the thumb screw 51 is loosened. After adjustment, the thumb screw may again be tightened to hold the assembly in its selected position.

In Figure 11 the bottom scraping elements, designated by numerals 96 to 99, are cut angularly as shown at 96'. This allows for a greater pressure to be put on the lower front edges of the scraping elements. The bottom scraping elements keep the bottom clean from any paste running from the top or sides in the element.

Operation

In operation, the machine is set up as usual, paste is placed in the paste pot 1 to the desired level. As the machine is operated the drive gear 9 is rotated operating the paste belt pulley 16. As the pulley 16 is rotated the paste belt 17 picks up paste from the paste pot as it moves around the paste pot pulley 16. The upper run of the belt then passes through the paste scraping assembly carrying paste across to the opposite side of the machine, around the belt pulley 26, and back over the trailing edges of the labels where it is applied as the containers roll through the machine. The paste carrying top run of belt 17 passes under the leading edge of the pad carrying support 100 over which the containers roll through the machine. The accurate adjustment of guide 29 is imperative to avoid contact of the paste with the support 100. When the belt moves out of the paste pot and before it enters the scraping assembly, it will carry a coating of paste on all its sides as shown at 101 in Figure 12. As the belt reaches the scraping edge 93 of the portion 34' of the bracket 19, much of the paste on the bottom and sides is scraped or wiped off and falls back into the paste pot. However, this scraping of the bottom and sides of the belt does not take all the paste from these surfaces. The adjustable plate 84 is adjusted to the thickness of the paste that will eventually occupy the center of the upper surface of the belt. The belt then passes between the bottom scraping elements carried on the portion 34 and the yieldable side and top scraping elements. As the belt moves through the paste scraping assembly, the bottom scraping elements scrape the film of paste from the underside of the belt and it is deposited back into the paste pot through openings 42 and 46. At the same time the top scrapers are scraping the top surface of the belt adjacent its edges and this surplus paste is collected in the openings between the top scraping elements. Because of the angle of these openings the movement of the belt urges the paste collected in the openings toward the center of the belt. Also, at the same time the side scraping elements are scraping the lateral edges of the belt, and as the side openings are connected with the top openings, the excess paste passes up the inclined side openings into the top openings, and is also urged toward the upper center of the belt along with the paste taken off the top scrapers, and the paste is collected at the belt center in a line as shown at 102 in Figure 13.

The pressure of the scrapers on the belt may be increased or decreased by the thumb screw 51 together with the bracket 50 which bears against the housing 47. The thickness of the paste on the upper side of the belt is regulated by the thumb screw 86 which raises and lowers the plate 84.

The advantage of the present invention is that the paste scraping assembly may be easily and quickly removed for cleaning or repairing by the loosening of the single thumb screw 20. The assembly itself may be disassembled by removing the plates 50 and 84 which are held by the thumb screws 51 and 86. The thorough scraping of the bottom, sides and the top edges of the belt makes it possible to operate the machine for longer periods without clogging, and also the machine can be operated much more economically in that a considerable amount of paste is saved by taking this thin dip of paste from the belt where it is not needed and depositing it in the center of the upper surface of the belt as illustrated in Figure 13. This collection of the paste by the top and side scraping elements and redepositing it into the center of the belt gives a more even deposit of paste upon the belt. For example, if the belt for some reason occasionally does not pick up sufficient paste to form a proper center strip, the paste in the upper openings between the top scrapers will be forced into the area C—D by the action of the belt to furnish the proper strip of paste on the belt.

While the invention has been illustrated and described in detail, the details are not intended to be limitations on the invention.

What is claimed as new and is desired to be secured by Letters Patent is:

1. In a paste applying device for a package labeling machine for cylindrical packages having means for applying paste to the trailing end of the label, comprising a paste pot on one side of the machine, an endless paste belt, a paste belt supporting pulley within said paste pot immersed into a prepared paste within said pot, a second paste belt supporting pulley on the opposite side of the horizontal path of the package, said endless paste belt extending between the pulley in the paste pot and the second mentioned pulley, scraping elements adjacent the paste pot for scraping the paste from the bottom, sides and from a portion of the top of the belt, the bottom scraper including a plurality of scraping elements with abrupt scraping edges and the scraper having openings between each of the bottom scraping elements through which the paste passes by gravity away from the belt.

2. In a device as set forth in claim 1, in which the side scraping elements are yielding and are angularly disposed to the horizontal plane of the path of the paste belt in which the scraping edge is directed upwardly to the belt top and toward the direction of the travel of the belt, said side scrapers being spaced apart providing openings therebetween extending upwardly past the upper surface of the belt.

3. In a device as set forth in claim 1 in which the top scraping elements comprise a plurality of yielding scraping elements each having a belt scraping edge thereon, the elements extending inwardly from each side of the belt and angularly over a portion of the upper face surface thereof adjacent its side edges, the scraping edges of the scraping elements extending outwardly from each side of the belt channel and in the direction of the travel of the upper run of the belt, and being spaced from each other over the belt, leaving an unscraped area adjacent the center of the upper surface of the belt for a strip of paste, said top scrapers being so spaced from each other on each side as to leave openings between each of the said elements for the flow of paste therein.

4. In a device as set forth in claim 1 comprising yieldable side and top scraping elements, the side elements comprising a plurality of individual elements having scraping edges extending upwardly and angularly to the plane of the belt and in the direction of the travel of the upper run of the belt, and being spaced apart to provide openings therebetween, said side openings extending upwardly past the upper surface of the belt and said top elements comprising a plurality of individual elements having scraping edges thereon adapted to contact the top belt surface, said elements extending inwardly and angularly to the path of the belt and in the direction of its travel from each side to a point less than one-half the width of the belt thereby leaving an unscraped area adjacent the center of the upper surface of the belt where the paste is carried, said top elements on each side being spaced to leave openings therebetween, the elements on the side and top joining and forming between them continuous angular passages, whereby the paste scraped from the sides and top areas of the belt is directed toward the center of the top run of the belt.

5. In a machine as set forth in claim 1 in which the bottom scraping edges are cut in relief.

6. In a paste applying device for applying paste to the trailing edge of labels in a package labeling machine, comprising a paste pot on one side of the machine, having a driving pulley adapted to rotate within said pot and means for driving said pulley, an endless paste belt adapted to be trained about said pulley for picking up paste from said pot, a second pulley for supporting the opposite end of the belt on the opposite side of the machine for assisting in properly locating the belt relative to the machine, a belt guide and wiping assembly adjustably carried adjacent the paste pot, a plurality of separate scraping elements extending along the bottom, sides and a portion of the top of the belt, said bottom scraper having a plurality of openings therebetween leading downwardly over the paste pot for returning to the pot excess paste scraped from the under surface of the belt.

7. In a device as claimed in claim 6 in which the bottom scraping elements are cut in relief from their leading edge in the direction of the movement of the upper run of the belt.

8. In a device as set forth in claim 6 in which the scraping edges of the side scraping elements are angled in relation to the belt surface toward the direction of the upper run of the belt and the top scraping elements extend toward the belt center, but are spaced therefrom, and the scraping edges thereof extend in the direction of travel of the upper run of the belt.

9. In a paste applying device for applying paste to the trailing edge of labels in a package labeling machine, comprising a paste pot on one side of the machine, an endless paste carrying belt, a pulley operable within said paste pot for supporting one end of the belt and a second pulley positioned on the opposite side of the machine for supporting the opposite end of the belt, means for determining the quantity and location of the paste carried by the belt to the labels, comprising a bracket, means for adjustably securing the bracket to the paste pot housing, a bottom scraping element fixedly secured to the said bracket, yieldable side and top scraping elements carried within a separate unit, adjustable means carried on the bracket for exerting pressure on the said unit toward the belt.

10. In a paste applying device for applying paste to the trailing edge of labels in a package labeling machine comprising, a paste pot on one side of the machine, an endless paste carrying belt, a pulley operable within said paste pot for supporting one end of the belt, a second pulley positioned on the opposite side of the machine for supporting the opposite end of the belt, an adjustable belt scraping assembly adjacent the paste pot for scraping and adjusting the position of the upper run of one end of the belt, a non-rotating adjustable guide member mounted adjacent the inner edge of the second mentioned pulley for adjusting the position of the opposite end of the upper run of the belt.

11. In a device as defined in claim 10 in which the adjustable guide member and the second mentioned pulley are both carried on a single adjustable bracket whereby the pulley and guide may be adjusted as a unit in the direction of the elongation of the belt.

12. In a device as defined in claim 10 in which the guide member is formed with contact surfaces for the belt adjacent the two outer edges of the belt only.

References Cited in the file of this patent

UNITED STATES PATENTS

| | | |
|---|---|---|
| 1,985,293 | Kimball | Dec. 25, 1934 |
| 2,206,964 | Kimball et al. | July 9, 1940 |
| 2,469,030 | Brown | May 3, 1949 |
| 2,517,395 | Lewis | Aug. 1, 1950 |
| 2,659,341 | Taggart | Nov. 17, 1953 |